United States Patent [19]

Engelhardt et al.

[11] Patent Number: 4,518,745
[45] Date of Patent: May 21, 1985

[54] METAL CHELATES OF WATER SOLUBLE COPOLYMERS

[75] Inventors: Friedrich Engelhardt, Frankfurt; Ulrich Greiner, Schöneck, both of Fed. Rep. of Germany

[73] Assignee: Cassella Aktiengesellschaft, Frankfurt am Main, Fed. Rep. of Germany

[21] Appl. No.: 554,950

[22] Filed: Nov. 25, 1983

[30] Foreign Application Priority Data

Dec. 24, 1982 [DE] Fed. Rep. of Germany ....... 3248019

[51] Int. Cl.³ .............................................. C08F 8/44
[52] U.S. Cl. ............................... 525/326.6; 8/94.1 R; 8/552; 8/557; 166/271; 252/8.55 R; 525/366; 525/370; 526/240; 526/241; 526/278
[58] Field of Search ........................ 526/240, 241, 278; 525/326.6, 370, 366

[56] References Cited

U.S. PATENT DOCUMENTS 3,297,663  1/1967  Herbst ................. 526/240
3,684,779  8/1972  Rapko ................. 526/278

Primary Examiner—Christopher A. Henderson
Attorney, Agent, or Firm—Connolly and Hutz

[57] ABSTRACT

Metal chelates of water soluble copolymers with polyvalent metal ions contain a statistical distribution of 1-86% by weight of structural units of the formula

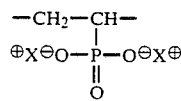

9-80% by weight of units of the formula

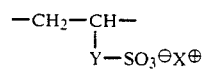

5-90% by weight of units of the formula

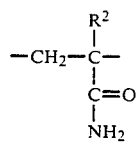

and up to 30% by weight of one or more units of the formulae

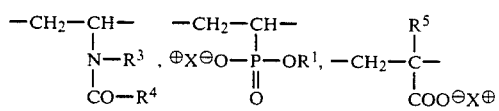

wherein $R^1$ is alkyl having 1 to 4 carbon atoms;
$R^2$ and $R^5$ independently of one another are each hydrogen or methyl;
$R^3$ and $R^4$ independently of one another are each hydrogen, methyl or ethyl or together are a trimethylene or pentamethylene;
Y is a direct bond, phenylene or a moiety of the formula $-CO-NH-C(CH_3)_2-CH_2-$; and
$X^{\oplus}$ is a cation or $H^{\ominus}$; and
wherein the chelating metal is polyvalent metal cations of the second to eighth main groups and of the second sub-group of the periodic system of the elements, and present in a ratio of 1:1 to 100:1 in terms of equivalents and said copolymers are useful as, inter alia, dyestuff auxiliaries and leather retanning agents.

6 Claims, No Drawings

METAL CHELATES OF WATER SOLUBLE COPOLYMERS

The present invention relates to water-soluble copolymers containing a statistical distribution of 1–86% by weight of radicals of the formula I

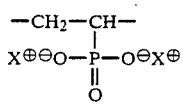

9–80% by weight of radicals of the formula II

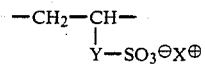

5–90% by weight of radicals of the formula III

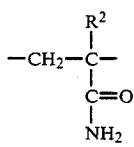

and, if appropriate, 0 to a total of 30% by weight of radicals of the formulae IV to VI

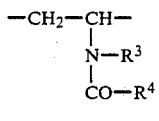

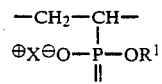

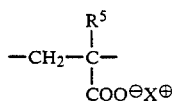

In the formulae I to VI, $R^1$ denotes alkyl having 1 to 4, preferably 1 or 2, C atoms; $R^2$ and $R^5$ independently of one another denote hydrogen or methyl; $R^3$ and $R^4$ independently of one another denote hydrogen, methyl or ethyl, or together represent trimethylene or pentamethylene, Y represents a direct bond, phenylene or a group of the formula $—CO—NH—C(CH_3)_2—CH_2-$ and $X^{\oplus}$ represents a cation or $H^{\oplus}$.

The invention also relates to the preparation of these copolymers and to the reaction thereof with polyvalent metal cations and their use as auxiliaries in textile dyeing and as retanning substances.

If it is not $H^{\oplus}$, the cation $X^{\oplus}$ can be derived, in principle, from any water-soluble known base which has a strength adequate for the neutralisation of the sulpho groups of the copolymers to be employed in accordance with the invention and which does not adversely affect the solubility in water of the copolymers. The selection can thus be made in a simple, known manner.

However, a cation represented by $X^{\oplus}$ is advantageously an alkaline earth metal cation or preferably an alkali metal cation, in particular a sodium or potassium cation, ammonium or a cation derived from lower aliphatic amines. Lower aliphatic amines from which the cations $X^{\oplus}$ can be derived are primary, secondary or tertiary and optionally contain alkyl groups which have 1 to 4 C. atoms and are substituted by —OH groups. Preferred amines are those containing at least one β-hydroxyethyl radical, such as, for example, β-aminoethanol, β-dimethylaminoethanol, bis-(β-hydroxyethyl)-methylamine, tris-(β-hydroxyethyl)-amine, diethyl-β-hydroxyethylamine and bis-(β-hydroxyethyl)-ethylamine.

Preferred copolymers consist of a statistical distribution of 10–40% by weight of radicals of the formula I, 10–70% by weight of radicals of the formula II, 20–80% by weight of radicals of the formula III and 0–20% by weight of radicals of the formulae IV, V and/or VI.

Copolymers which can be employed particularly preferably contain radicals of the formula II in which Y denotes the radical $—CO—NH—C(CH_3)_2—CH_2—$, and radicals in which $R^1 = R^2 = CH_3$.

The copolymers defined above can, of course, also contain in the molecule several different individuals belonging to each of the component groups defined by the general formulae I to IV and differing in the meanings of the symbols Y or $R^1$ to $R^5$. Thus they can contain, in the same polymer molecule, for example, both 2-acrylamido-2-methylpropanesulphonic acid (AIBA) units and vinylsulphonic acid units or open-chain as well as cyclic vinylamide units of the formula IV or alternatively vinylphosphonic acid esters containing various alkyl radicals $R^1$ of differing chain lengths. As a rule, the copolymers contain not more than 3, preferably not more than 2, different units belonging to each of the individual groups of the general formulae I to IV.

The preparation of water-soluble polymers containing sulphonic acid groups incorporated in the macromolecule has already been described in detail in numerous patents and in the specialist literature. Thus, for example, the synthesis of copolymers of vinylsulphonic acid with acrylamide and vinylpyrrolidone has been published in J. Polymer Sci., 38 147 (1959).

A process for the preparation of water-soluble copolymers formed from vinylsulphonic acid and acrylonitrile or methacrylonitrile, optionally mixed with further ethylenically unsaturated compounds has been described in German Pat. No. 1,101,760. Copolymers formed from vinlysulphonates or alkylsulphonates with acrylamide and vinylamides have been described, for example, in German Auslegeschrift No. 2,444,108.

Water-soluble copolymers containing, as the comonomer, 2-acrylamido-2-methylpropane-3-sulphonic acid, abbreviated in the following text to AIBA, are described in U.S. Pat. Nos. 3,953,342, 3,768,565, 3,907,927 and 3,926,718 and also in German Offenlegungsschriften Nos. 2,502,012 and 2,547,773.

The copolymers defined above, insofar as they contain, in a copolymerised form, comonomers of the formula IV in which $R^3$ and $R^4$ together denote trimethylene or pentamethylene, can be prepared in the manner known from the state of the art, for example in accordance with the instructions of U.S. Pat. No. 3,929,741 by reacting the monomers at temperatures of about 10° to 120° C., preferably at 40° to 80° C., in the presence of suitable polymerisation catalysts.

If it is desired to carry out, under analogous conditions, the copolymersation of AIBA, styrenesulphonic acid or vinylsulphonic acid with non-cyclic N-vinylamides, that is to say those of the general formula

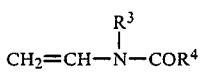

in which $R^3$ and $R^4$ do not together denote trimethylene or pentamethylene, it is necessary to convert the acid components into their salts containing the cation $X^\oplus$ by adding bases, prior to the polymerisation.

The bases which are advantageously employed in this connection are the hydroxides or salts of the cations $X^\oplus$ with weak acids, such as, for example, carbonic acid or phosphoric acid, or, in the case of amine bases, $NH_3$ or the free amines. is also possible and, as a rule, even advantageous, to neutralise the acid components prior to the polymerisation.

Hence, for the preparation of each 100 parts by weight of the copolymer, it is advantageous to dissolve 1–86% by weight of a vinylphosphonic acid of the formula Ia

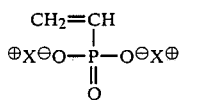

9–80 parts by weight of an olefinically unsaturated sulphonic acid of the formula IIa $$CH_2=CH-Y-SO_3H \quad \text{(IIa)}$$

and, if appropriate, 0 to 30 parts by weight of methacrylic and/or acrylic acid in water or in a water/alkanol mixture in which the finished copolymer is also still soluble, or in a water-miscible organic solvent, to neutralise the acid groups by adding a base, of necessity in the event that $R^3$ and $R^4$ do not together denote trimethylene or pentamethylene, or optionally in the event that $R^3$ and $R^4$ together denote trimethylene or pentamethylene, then to add 0 to 30 parts by weight of a vinylacylamine of the formula IVa

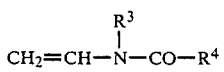

wherein $R^3$ and $R^4$ are identical or different and independently of one another denote hydrogen, methyl or ethyl or together denote trimethylene or pentamethylene, and/or 0 to 30 parts by weight of a vinylphosphonic acid eser of the formula Va

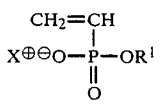

wherein $R^1$ has the abovementioned meanings, and, if appropriate, 5 to 90 parts by weight of acrylamide and/or methacrylamide, and to initiate the copolymerisation in a manner which is in itself known and to carry it out at 10° to 120° C. Copolymers in which $X^\oplus$ is $H^\oplus$ can be obtained by reacting the copolymers thus prepared with acids.

Preferred copolymers according to the invention are obtained if 10–40 parts by weight of the vinylphosphonic acid of the formula Ia, 10–70 parts by weight of the unsaturated sulphonic acid of the formula IIa, 20–80 parts by weight of acrylamide and/or methacrylamide and 0–20 parts by weight of the vinylacylamine of the formula Iva and/or vinylphosphonic acid ester and/or acrylic acid and/or methacylic acid are employed for the preparation of each 100 parts by weight of copolymer.

The polymerisation can be carried out as solution polymerisation, as precipitation polymerisation or in an inverted emulsion.

If water or a water/alkanol mixture is used as the solvent, a water-miscible alkanol having 1 to 4 C atoms being employed and the finished copolymer being soluble in the water/alkanol mixture, the polymerisation takes place under the conditions of solution polymerisation, and a viscous, aqueous or aqueous/alkanolic solution of the copolymer according to the invention is obtained, from which the product can be isolated by distilling off the solvent or by precipitation by mixing the solution with a water-miscible organic solvent, such as methanol, ethanol, acetone or the like.

Preferably, however, the resulting aqueous or aqueous/alkanolic solution is taken for the intended use without further treatment, if necessary after adjusting the concentration to a desired level.

If the copolymerisation is carried out in a water-miscible organic solvent, the reaction is conducted under the conditions of precipitation polymerisation. In this case the polymer is obtained directly in a solid form and can be isolated by distilling off the solvent or by filtration with suction, and drying.

Possible water-miscible organic solvents, which are suitable for the preparative process according to the invention are, in particular, water-soluble alkanols, namely those having 1 to 4 C atoms, such as methanol, ethanol, propanol, isopropanol or n-, sec.- and isobutanol and preferably tert.-butanol.

The water content of the lower alkanols employed in this case as the solvent should not exceed 6% by weight, since otherwise lumps can be formed during the polymerisation. It is preferable to work at a water content of 0–3% by weight.

The amount of solvent to be employed depends to a certain extent on the nature of the comonomers employed.

As a rule, 200 to 1000 g of solvent are employed per 100 g of total monomers.

If the copolymerisation is carried out in an inverted emulsion, the aqueous solution of monomers is emulsified in a known manner in a water-immiscible organic solvent, such as cyclohexane, toluene, xylene, heptane or high-boiling petroleum ether fractions, with the addition of 0.5–8% by weight, preferably 1–4% by weight, of known emulsifiers of the w/o type, and is polymerised using customary free radical-forming initiators.

The principle of inverted emulsion polymerisation is known from U.S. Pat. No. 3,284,393. In this process, water-soluble monomers or mixtures thereof are polymerised under hot conditions to give high-molecular copolymers by first emulsifying the monomers or aqueous solutions thereof, by adding water-in-oil emulsifiers, in a water-immiscible organic solvent which forms the continuous phase, and by warming this emulsion in the presence of free-radical initiators. The comonomers to be employed can be emulsified as such in the water-immiscible organic solvent, or they can be employed in the form of an aqueous solution containing between 100 and 5 per cent by weight of comonomers and 0 to 95 percent by weight of water, the composition of the aqueous solution being a matter of the solubility of the comonomers in water and of the intended polymerisation temperature. The ratio between the water and the monomer phase can be varied within wide limits and, as a rule, is 70:30 to 30:70.

In order to emulsify the monomer phase in the water-immiscible organic solvent to give a water-in-oil emulsion, 0.1 to 10 percent by weight, relative to the oil phase, of a water-in-oil emulsifier are added to the mixtures. It is preferable to use emulsifiers which have a relatively low HLB value. In principle, any inert, water-insoluble liquid, that is to say in principle any hydrophobic organic solvent, can be employed as the oil phase. In general, hydrocarbons having a boiling point within the range from 120° to 350° C. are used within the scope of the present invention. These hydrocarbons can be saturated, linear or branched paraffin hydrocarbons, such as occur mainly in petroleum fractions, and the latter can also contain the customary proportions of naphthene hydrocarbons. However, it is also possible to employ aromatic hydrocarbons, such as, for example, toluene or xylene, and also mixtures of the hydrocarbons mentioned above, as the oil phase. It is preferable to use a mixture of saturated normal and isoparaffin hydrocarbons containing up to 20 percent by weight of naphthenes.

A detailed description of the process is to be found, for example, in German Patent Specification No. 1,089,173 and in U.S. Pat. Nos. 3,284,393 and 3,624,019.

Copolymers having a particularly high degree of polymerisation are obtained if the polymerisation is carried out in aqueous solution by the process of so-called gel polymerisation. In this process, 15-20% strength aqueous solutions of the comonomers are polymerised using known suitable catalyst systems without mechanical mixing, by making use of the Trommsdorff-Norrish effect (Bios Final Report 363,22; Makromol. Chem. 1, 169 (1947)). Average molecular weights of an order of magnitude of $10^6$ can be estimated for the products according to the invention from the viscosities of aqueous solutions of the water-soluble copolymers according to the invention which have been prepared in this manner and which are to be employed in accordance with the invention, taking as a basis the customary model conceptions concerning the relationship between viscosity and average molecular weight of polymeric substances, and also taking into consideration comparative values of polymers having a similar structure.

The polymerisation reaction is carried out within the temperature range between $-20°$ and 150° C., preferably between 5° and 90° C., and it is also possible to work under normal pressure or under elevated pressure. As a rule, the polymerisation is carried out in an atmosphere of a protective gas, preferably under nitrogen.

The polymerisation can be initiated by using high-energy electromagnetic radiation or the customary chemical polymerisation initiators, for example organic peroxides, such as benzene peroxide, tert.-butyl hydroperoxide, methyl ethyl ketone peroxide or cumene hydroperoxide, azo compounds, such as azodiisobutyronitrile or 2'-azo-bis-(2-amidinopropane) dihydrochloride

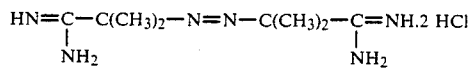

and inorganic peroxy compounds, such as $(NH_4)_2S_2O_8$ or $K_2S_2O_8$ or $H_2O_2$, if appropriate in combination with reducing agents, such as sodium bisulphite and iron-II sulphate, or redox systems containing, as the reducing component, an aliphatic and an aromatic sulphinic acid, such as benzenesulphinic acid and toluenesulphinic acid or derivatives of these acids, such as, for example, Mannich adducts formed from a sulphinic acid, aldehydes and amino compounds, such as are described in German Patent Specification No. 1,301,566. As a rule, 0.03 to 2 g of the polymerisation initiator are employed per 100 g of total monomers.

The quality properties of the polymers can be improved further by subsequently heating the polymer gels obtained by the process of gel polymerisation, for several hours within a temperature range of 50°-130° C., preferably 70°-100° C.

The copolymers according to the invention which have been prepared in this way and are present in the form of aqueous gels can be dissolved directly in water and used, after mechanical comminution by means of suitable equipment. However, they can also be obtained in a solid form after the water has been removed by known drying processes, and only be redissolved in water when they are used.

The copolymers defined above are capable of reacting to form chelates with polyvalent metal cations, particularly those of the third to eighth groups and also of the second sub-group of the periodic system of the elements. Even the metals of the second main group also exhibit a marked chelating action. This is effected by combining the said copolymers with salts of these metals, 1 to 100 g equivalents of the copolymer being combined, as a rule, per g equivalent of the metal cation. As a rule, the reaction is carried out in water or in a water-miscible organic solvent or in mixtures thereof, but prefereably in water, and the metal cations are employed in the form of an aqueous solution of a water-soluble salt of the metal concerned. Depending on the nature of the cation, the chelating reaction takes place in a neutral or alkaline pH range or, in the case of very active cations (such as, for example, titanium or zirconium), even in a strongly acid range. The reaction proceeds very rapidly at temperatures as low as room temperature and is complete after a few seconds to a few minutes in most cases, such as, for example, in the case of Ti, Zr, Fe or Al, or after a few hours in rarer cases, (such as, for example, in the case of cadmium).

In the chelating reaction, a quantity of the cations represented by $X^\oplus$ equivalent to the added quantity of polyvalent metal ions is liberated, and crosslinking of the polymer strands results via the polyvalent metal ions.

This chelating capacity of the polymers defined above can be utilised, in the first place, to bind the cations concerned firmly and to mask them, in order to eliminate them or render them ineffective. In the second place, the metal chelates of the polymers possess extremely valuable technical properties in themselves. A particularly striking factor is the extremely high viscosity of even very dilute aqueous solutions of the chelated copolymers.

This makes it possible to employ the polymers described as thickeners in aqueous paints or printing inks or in dispersions of binders when impregnating and coating textile sheet-like structures.

A further field of use consists in the preparation of coatings and polishes of high water resistance on wood, rubber, glass, tile, plastics and linoleum surfaces, by combining suitable aqueous polymer dispersions with the copolymers according to the invention which have been crosslinked by the addition of polyvalent metal ions.

The copolymers according to the invention are themselves also suitable as dyeing auxiliaries, particularly in the dyeing of cellulose-containing fibre materials by the pad cold-batch process. As a result of adding the copolymers according to the invention, the liquor pick-up of the cellulose-containing textile material to be dyed is substantially increased, which results in better dyeing in depth of even voluminous textile sheet-like structures, such as, for example, knitted goods. This results in dyeings of good evenness and an excellent appearance.

If the new copolymers according to the invention are used in pigment dyeing, dyeings of good evenness and depth of shade are obtained.

When employed in the padding liquors containing disperse dyestuffs, such as are used for dyeing polyester materials, the new copolymers according to the invention produce an excellent evenness and brilliance in the dyeings finished therewith.

Furthermore, copolymers according to the invention having K-values of less than 45, approximately corresponding to molecular weights less than 50,000 are advantageously suitable for use as a so-called retanning substance, particularly for chrome leather.

The copolymer products of the invention are also suited for use as auxiliaries in the oilfield sector for secondary and tertiary recovery of oil and gas.

Water-soluble copolymers containing a statistical distribution of 1–86% by weight of radicals of the formula

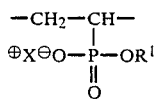

9–80% by weight of radicals of the formula

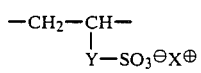

5–90% by weight of radicals of the formula

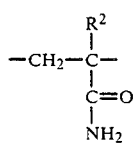

and, if appropriate, 0 to a total of 30% by weight of radicals of the following formulae

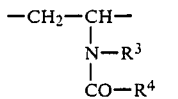

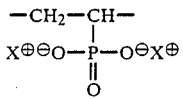

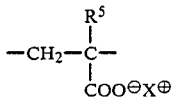

in which formulae $R^1$ denotes alkyl having 1 to 4, preferably 1 or 2, C atoms and $R^2$ and $R^5$ independently of one another denote hydrogen or methyl, $R^3$ and $R^4$ independently of one another denote hydrogen, methyl or ethyl, or together represent trimethylene or pentamethylene, and Y represents a direct bond, phenylene or a group of the formula $-CO-NH-C(CH_3)_2-CH_2-$ and $X^\oplus$ represents a cation, the preparation thereof and the use thereof form the subject of former German Patent Application No. P 3,245,541.0.

Those of the copolymers defined above which have a content of 30–86% by weight of structural groups of the formula I (vinylphosphonic acid units) and/or have a proportion of 0 to 1% by weight of structural groups of the formula V (vinylphosphonic acid ester units) are new.

Water-soluble copolymers containing a statistical distribution of A % by weight of radicals of the formula I

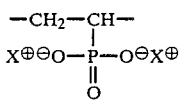 (I)

9–80% by weight of radicals of the formula II

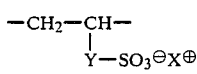 (II)

5–90% by weight of radicals of the formula III

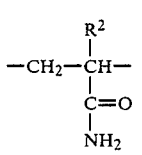 (III)

B % by weight of radicals of the formula V

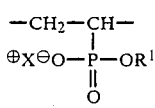 (V)

and, if appropriate, 0 to a total of 30% by weight of radicals of the formulae IV and/or VI

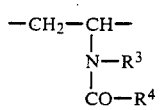  (IV)

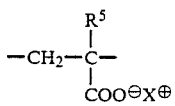  (VI)

in which formulae I to IV $R^1$ denotes alkyl having 1 to 4, preferably 1 or 2, C atoms, $R^2$ and $R^5$ independently of one another denote hydrogen or methyl; $R^3$ and $R^4$ independently of one another denote hydrogen, methyl or ethyl or together represents trimethylene or pentamethylene, and Y represents a direct bond, phenylene or a group of the formula —CO—NH—C(CH$_3$)$_2$—CH$_2$— and $X^\oplus$ represents a cation, are therefore new, provided that either A is an amount of 30–86 and B is an amount of 1 to 30 or A is an amount of 1 to 86 and B is an amount of 0 to 1.

New copolymers according to the invention are, therefore, always obtained if, in a copolymerisation process such as is described above, the vinylphosphonic acid of the formula Ia is employed in an amount of 30–86 parts by weight or if the vinylphosphonic acid ester of the formula Va is employed in an amount of 0 to 1 parts by weight.

Preferred new copolymers consist of a statistical distribution of 30–40% by weight of radicals of the formula I, 10 to 50% by weight of radicals of the formula II, 20–80% by weight of radicals of the formula III and 0–20% by weight of radicals of the formulae IV, V and/or VI, or of 10–40% by weight of radicals of the formula I, 10–50% by weight of radicals of the formula II, 20–80% by weight of radicals of the formula III and 0–1% by weight of radicals of the formulae IV, V and/or VI.

The equivalent weights which should be taken into account in chelating the copolymers with polyvalent metal cations are calculated in a known manner for the metal cation as the quotient of the atomic weight and valency and, in the case of the copolymer, as the quotient of the average molecular weight and the average number of acid groups in the polymer molecule.

In practice, the equivalent weight of the copolymer can be calculated by dividing the amount by weight of the monomers employed in a polymerisation batch by the molar amount of the monomers containing an acid group in this batch.

The illustrative embodiments which follow demonstrate the preparation of polymers according to the invention. All % figures relate to amounts by weight.

The abbreviations used in the illustrative embodiments and the tabular examples have the following meanings:

| | |
|---|---|
| AM | Acrylamide |
| VIMA | N—Vinyl-N—methylacetamide |
| VIPY | N—Vinylpyrrolidone |
| AIBA | 2-Acrylamido-2-methylpropanesulphonic acid |
| VA | Vinylacetamide |
| VIFA | Vinylformamide |
| VSA-Na | Sodium vinylsulphonate |
| Styrene SA | Styrenesulphonic acid |
| VPA | Vinylphosphonic acid |
| VPE | Methyl vinylphosphonate |
| AA | Acrylic acid |
| MAA | Methacrylic acid |

EXAMPLE 1

(Emulsion polymerisation)

7.2 g of ®Arkopal N 100 (a nonionic emulsifier based on an oxethylated phenol derivate) and 19.4 g of ®Span 80 (a nonionic emulsifier based on a sugar alcohol stearate) are dissolved in ®Isopar M (a technical mixture of isoparaffins having a boiling point of approx. 200°–240° C.), and the resulting solution is charged to a 1 liter reaction vessel equipped with a stirrer, a thermometer and a nitrogen inlet. A monomer solution is then prepared by dissolving 97.2 g of acrylamide, 9,7 g of AIBA and 1.1 g of vinylphosphonic acid (VPA) in 105 ml of water.

The pH value of the monomer solution is adjusted to 8.5 with 25% strength ammonia. The aqueous monomer solution is added to the organic phase with rapid stirring. The reaction vessel is evacuated and is then filled with nitrogen. A solution of 0.0275 g of ammonium persulphate in 3 ml of water is then added to the mixture and the polymerisation is thus initiated. The reaction lasts 1½ hours; the reaction temperature is kept between 30° and 40° C. The product is a stable emulsion which can be inverted in water in a manner which is in itself known by using commercially available surface-active agents. The resulting polymer solution has a K-value of 150.8.

If 1 ml of a 3% strength solution of titanium acetate of zirconium acetate is added to 200 ml of a 0.6% strength aqueous solution of the polymer, a highly viscous solution is formed, which can be employed as a thickener.

EXAMPLE 2

(Solution polymerisation)

70 g of AIBA are dissolved in 200 g of water and neutralised with 25% strength ammonia in a polymerisation flask of 1 liter capacity, equipped with a flat-flange lid, a stirrer, a thermometer and a gas inlet tube. 10 g of acrylamide and 10 g of VPA are then added. The pH value is adjusted to 8.5, and 10 g of N-vinyl-N-methylacetamide are added. The reaction mixture is heated to 60° C., while stirring and passing in nitrogen. 1 g of an aqueous, 10% strength solution of dibutylamine HCL and 0.1 g of ammonium persulphate are then also added. The reaction lasts about 30 minutes, and the temperature rises to 70° C. The reaction mixture becomes viscous. It is heated for a further 2 hours at 80° C., with stirring. A clear, highly viscous solution is obtained. The K value is 147.1.

EXAMPLE 3

(Gel polymerisation)

A monomer solution is prepared by dissolving 60 g of acrylamide, 30 g of AIBA and 10 g of VPA in 250 g of water in a polymerisation flask of 1 liter capacity, equipped with a flat-flange lid, a stirrer, a thermometer and a gas inlet tube. The pH value is adjusted to 8.5 with 25% strength ammonia. 1 g of an aqueous, 10% strength solution of dibutylamine HCl and 0.1 g of ammonium persulphate are then added, while stirring and passing in nitrogen. The mixture is stirred for a further 3 minutes at an increased speed, while nitrogen is passed in. The introduction of nitrogen is terminated and the inlet tube and the stirrer are lifted up. The polymerisation sets in after an induction time of 30 minutes, the temperature rising from 20° C. to 78° C. and the solution changing into a gel of stable shape. The K value is 238.0.

If 1 ml of a 3.6% strength solution of zirconium acetate are added to 200 ml of a 0.5% strength aqueous solution, a highly viscous, thixotropic mass is formed.

EXAMPLE 4

(Precipitation polymerisation)

49.7 g of acrylamide, 7.1 g of AIBA, 10.7 g of VPA and 3.6 g of methacrylic acid (MAA) are dissolved in 440 ml of tert.-butanol in a polymerisation flask of 1 liter capacity, equipped with a stirrer, a reflux condenser, a thermometer, a dropping funnel and a gas inlet tube. The monomer solution is heated to 50° C. while stirring and passing in nitrogen, and 1 g of azoisobutyronitrile, dissolved in 5 ml of DMF, is added dropwise. The polymerisation sets in after an induction time of 30 minutes, the reaction temperature rises to 68° C. and the polymer is precipitated. The mixture is heated for a further 2 hours at 80° C. The copolymer can be isolated by being filtered off with suction and dried. It is also possible, however, to distil off the solvent under reduced pressure, without further treatment. The polymer is obtained in the form of a white, lightweight powder, which dissolves readily in water and has a K value of 106.2.

The copolymers in the following table can also be prepared in accordance with these four procedures.

The molecular weight of the copolymers of this invention can be calculated on the basis of viscosity data using the customary model conceptions of the correlation between the viscosities of polymer substances and their mean molecular weight and considering comparative values of similar structured polymers.

The viscosity data taken as a basis for these calculations were obtained in a 0.05% by weight solution of the copolymers in 20% by weight hydrochloric acid at 20° C. using a Brookfield viscosimeter at a shearing rate of 7.5 sec$^{-1}$.

TABLE

| No. | % AM | % AIBA | % VPE | % VPA | % AA | % MAA | % VIFA | % VIMA | % VIPY | % VSA—Na | % Styrene SA | % VA | K value |
|---|---|---|---|---|---|---|---|---|---|---|---|---|---|
| 1 | 5 | 15 | | 80 | | | | | | | | | 20.8 |
| 2 | 5 | 15 | 5 | 75 | | | | | | | | | 16.1 |
| 3 | 5 | 65 | | 10 | | | | | 11 | | 9 | | 140.4 |
| 4 | 20 | 10 | | 40 | | 20 | | | | | 10 | | 53.8 |
| 5 | 50 | 15 | | 5 | 5 | | | | 25 | | | | 123.1 |
| 6 | 90 | 9 | | 1 | | | | | | | | | 244.1 |
| 7 | 85 | 10 | 3 | 2 | | | | | | | | | 230.3 |
| 8 | 75 | 12 | | 10 | | | | | | | 3 | | 219.3 |
| 9 | 70 | 5 | 5 | 10 | 5 | | | | | 5 | | | 188.0 |
| 10 | 70 | 10 | 5 | 10 | | 5 | | | | | | | 206.1 |
| 11 | 60 | 20 | 5 | 10 | | | 5 | | | | | | 178.3 |
| 12 | 65 | 10 | 10 | 10 | | | | | | | | 5 | 169.1 |
| 13 | 10 | 80 | | 10 | | | | | | | | | 184.3 |
| 14 | 10 | 70 | | 10 | | | | 10 | | | | | 156.1 |
| 15 | 10 | 60 | | 10 | | | | 10 | | | | 10 | 148.7 |
| 16 | 30 | 50 | 5 | 5 | | | | | | 10 | | | 138.1 |
| 17 | 40 | 40 | 10 | 5 | | | 5 | | | | | | 125.1 |
| 18 | 50 | 30 | 5 | 5 | 5 | 5 | | | | | | | 164.9 |
| 19 | 50 | 9 | 11 | 5 | 15 | 5 | | | 5 | | | | 147.6 |
| 20 | 40 | 15 | 30 | 5 | | | | | | 8 | 2 | | 156.3 |
| 21 | 45 | 10 | 15 | 5 | | | | | 20 | 5 | | | 126.8 |
| 22 | 25 | 10 | 5 | 20 | | | | | | 40 | | | 130.7 |
| 23 | 5 | 9 | | 86 | | | | | | | | | 16.3 |
| 24 | 50 | 9 | 11 | 30 | | | | | | | | | 89.3 |
| 25 | 40 | 10 | 10 | 10 | | | | 30 | | | | | 100.1 |
| 26 | 50 | 10 | | 10 | | 30 | | | | | | | 121.2 |
| 27 | 50 | 20 | | 15 | 15 | | | | | | | | 134.1 |
| 28 | 30 | 15 | | 10 | | | 10 | 10 | 10 | 15 | | | 128.6 |
| 29 | 25 | 20 | 25 | 10 | | | 10 | | | | | 10 | 132.0 |
| 30 | 30 | 20 | | 20 | | | 5 | | | | | 25 | 136.1 |

EXAMPLE 5

(a) A gas well in West Texas is selected to fracture-acidize. The well has a production interval from a depth of 2,940 to 2,970 meters. At this interval, the bottom hole static temperature is 76° to 77° C., while the formation permeability averages 0.1 md. The well productivity per day prior to treatment is about 112 m$^3$ of gas and about 790 l of condensate by natural flow.

The fracture-acidizing fluid is prepared by blending 151,400 liters of a 15% hydrochloric acid solution containing 302 l, 0.2% by weight, of a common corrosion inhibitor with 1,726 kg of a water-in-oil emulsion of a copolymer. The copolymer contains 35% by weight of acrylamide, 50% by weight of AIBA and 5% by weight of VPA and of VIPY which has a polymer content of 32% by weight. In addition, 300 2 l, 0.2% by weight, of a nonionic fluorosurfactant are also blended into the treating fluid. After one hour of storage in two frac tanks, a low viscosity fluid (~37 cps at 511 sec$^{-1}$ on a Fann 35) is obtained. This treating fluid is injected into the above well bore while simultaneously metering in, per 250 l of the treating fluid, 550 ml of a 10% by weight zirconiumtetrachloride solution in 15% strength hydrocloric acid. The injection rate is about 1,950 l per minute at a surface treating pressure of 420 bar. After approximately 75 to 80 minutes, the well is shut-in for 6 hours to allow the acid to react. After this time, the well head pressure is relieved and the well is placed back into a flowing status. The well productivity is tested and found to be significantly improved.

(b) The copolymer used in paragraph (a) above was prepared as follows:

43.2 kg of ®Arkopal N 100 (a nonionic emulsifier based on an oxethylated phenol derivative) and 116.4 kg of ®Span 80 (a nonionic emulsifier based on a sugar alcohol stearate) are dissolved in 600 kg of ®Isopar M (a technical mixture of isoparaffins having a boiling point of approx. 200°-240° C.), and the resulting solution is charged to a 1 liter reaction vessel equipped with a stirrer, a thermometer and a nitrogen inlet. A monomer solution is then prepared by dissolving 227 kg of acrylamide, 324 kg of AIBA, 32.4 kg of vinylphosphonic acid (VPA) and 65 kg of VIPY in 630 l of water.

The pH value of the monomer solution is adjusted to 8.5 with 25% strength ammonia. The aqueous monomer solution is added to the organic phase with rapid stirring. The reaction vessel is evacuated and is then filled with nitrogen. A solution of 165 g of ammonium persulphate in 18 l of water is then added to the mixture and the polymerisation is thus initiated. The reaction lasts 1½ hours; the reaction temperature is kept between 30° C. and 40° C. The product is a stable emulsion which can be inverted in water in a manner which is in itself known by using commercially available surface-active agents. The resulting polymer solition has a K-value of 140.1.

EXAMPLE 6

(a) A mixed fabric of polyester fibres and viscose staple fibres mixed in the ratio of 70:30 is padded, the liquor pick-up being 60% relative to dry weight, with a liquor which contains, per liter of water, 50 g of the disperse dyestuff C.I. Disperse Orange 13 in its commercial form and nature, and 15 ml of a 4% strength solution of a copolymer of the composition according to tabulated Example 7, prepared according to Example 3, the liquor having been adjusted to a pH value of 5.5 with 20% strength acetic acid.

The fabric padded in this way is dried at a temperature of 130° C. and is then themosol-treated for 60 seconds at a temperature of 210° C.

The dyeing is then after-treated by soaping at the boil. An orange dyeing of maximum brilliancy and excellent levellness is thus obtained on the polyester constituent of the fabric.

(b) The copolymer of the invention used in para. (a) above was prepared as follows:

10 g of AIBA and 2 g of VPA are dissolved in 200 g of water in a polymerisation flask of 1 liter capacity, equipped with a flat-flange lid, a stirrer, a thermometer and a gas inlet tube, and are neutralised with 25% strength ammonia. 85 g of acrylamide and 3 g of VPM are then added. The pH value is adjusted to 8.5 and 1 g of an aqueous 10% strength solution of dibutylamine HCl and 0.1 g of ammonium persulfaphate are also added to the reaction mixture while being stirred and while nitrogen is passed in.

The mixture is stirred for a further 3 minutes at an increased speed, while nitrogen is passed in. The introduction of nitrogen is terminated and the inlet tube and the stirrer are lifted up. The polymerisation sets in after an induction time of 30 minutes, the temperature rising from 20° C. to 75° C. and the solution changing into a gel of stable shape. The K-value of the polymer obtained is 230.3.

If 1 ml of a 3.6% strength solution of zirconium acetate are added to 200 ml of a 0.5% strength aqueous solution, a highly viscous, thixotropic mass is formed.

EXAMPLE 7

A cotton terry towelling is padded with a dye liquor which contains, per liter, 40 g of the commercial dyestuff ®Remazol yellow FG, 30 g of sodium sulphate, 20 g of sodium hydroxide solution (32.5% strength) and 20 ml of a 4% strength solution of the copolymer prepared according to Example 6b.

The padded material is squeezed to a liquor pick-up of 90% and is rolled up. The goods are allowed to stand for 20 hours with slow turning of the roll. Subsequently, the dyed material is saponified in the customary manner, is given a hot and cold rinse and is dried. A full, brilliant yellow dyeing with excellent levellness and penetration of the dye is obtained.

In a manner analogous to with Examples 6 to 7 other copolymers of Examples 1 to 4 and the tables can be employed to enhance the levellness and dye penetration of textile dyeings.

EXAMPLE 8

(a) 100 parts of a chrome-tanned calf leather neutralised in a customary manner, are after-treated for 90 minutes and at 30° C. with a solution of 200 parts of water and 5 parts, relative to dry substance, of the polymer prepared according to para. (b) below.

After a short rinse the after-treated leather is greased in a customary manner with 4 to 6 parts of a light-fast greasing agent based on sulphonated sperm oil and is subsequently dried.

A leather of a bright color, with excellent fastness to light, a soft, full feel and a fine grain is obtained.

(b) The copolymer used in para. (a) above is prepared as follows:

52.8 g of acrylamide, 8.5 g of AIBA, 7.1 g of VPA and 2.1 g of styrenesulfonic acid (styrene-SA) are dissolved in 440 ml of tert.-butanol in a polymerisation flask of 1 liter capacity equipped with a stirrer, a reflux condenser, a thermometer, a dropping funnel and a gas inlet tube. The monomer solution is heated to 50° C. while being stirred and while nitrogen is passed in, and 1 g of azoisobutyronitrile, dissolved in 5 ml of DMF, is added dropwise. The polymerisation sets in after an induction time of 30 minutes; the reaction temperature rises to 68° C. and the polymer is precipitated. The mixture is subsequently heated for a further 2 hours at 80° C. The copolymer can be isolated by filtration with suction and drying. However, it is also possible to remove the solvent directly by distillation under reduced pressure. The polymer is obtained in the form of a white, light-weight powder which dissolves readily in water and has a K-value of 40.1.

EXAMPLE 9

(a) 200 parts of water are added to 100 parts of chrome-tanned sheep leather at 40° C. Thereafter, 10 parts, relative to dry substance, of a polymer according to tabulated Example 1 and prepared in analogy with Example 1, are added to the liquor which is then allowed to act on the leather for 2 hours at 40° C. After a rinse the treated leather is greased with about 5 parts of a conventional greasing agent and is subsequentlay dried. A full, pliable leather with a close and hard grain is obtained.

(b) 7.2 or ®Arkopal N 100 (a nonionic emulsifier based on an oxethylated phenol derivative) and 19.4 g of ®Span 80 (a nonionic emulsifier based on a sugar alcohol stearate) are dissolved in ®Isopar M (a technical mixture of isoparaffins having a boiling point of approx. 200°-240° C.) and the resulting solution is charged to a 1-liter reaction vessel equipped with a stirrer, a thermometer and a nitrogen inlet. A monomer solution is then prepared by dissolving 5.4 g of acrylamide, 17.5 g of AIBA and 86,4 g of vinylphosphonic acid (VPA) in 105 ml of water. The pH value of the monomer solution is adjusted to 8.5 with 25% strength ammonia. The aqueous monomer solution is added to the organic phase while stirring rapidly. The reaction vessel is evacuated and then filled with nitrogen. A solution of 0.0275 g of ammonium persulphate in 3 ml of water is then added to the mixture, and the polymerisation is stus stated. The reaction lasts 1.5 hours; the reaction temperature is kept between 30° and 40° C. This results in a stable emulsion which can be inverted in water in a manner which is in itself known by using commerically available surface-active agents. The resulting polymer solution has a K-value of 20.8.

What is claimed is:

1. Metal chelates of water-soluble copolymers containing a statistical distribution of 1–86% by weight of structural units of the formula

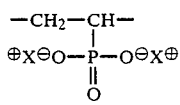

9–80% by weight of units of the formula

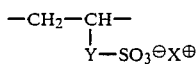

5–90% by weight of units of the formula

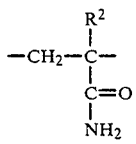

and up to 30% by weight of one or more units of the formulae

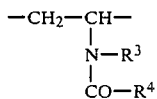

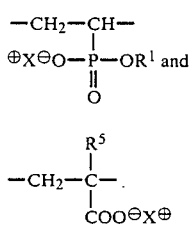

wherein $R^1$ is alkyl having 1 to 4 carbon atoms;
$R^2$ and $R^5$ independently of one another are each hydrogen or methyl;
$R^3$ and $R^4$ independently of one another are each hydrogen, methyl or ethyl or together are a trimethylene or pentamethylene;
Y is a direct bond, phenylene or a moiety of the formula $-CO-NH-C(CH_3)_2-CH-$; and
$X^\oplus$ is a cation or $H^\oplus$; and
wherein the chelating metal is polyvalent metal cations of the third to eighth groups and of the second sub-group of the periodic system of the elements and the ratio of copolymer to metal is 1:1 to 100:1 in terms of equivalents.

2. Metal chelates of water-soluble copolymers according to claim 1 wherein the copolymer has a statistical distribution of 10–40% by weight of units of the formula

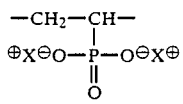

10–70% by weight of units of the formula

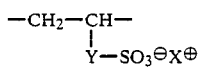

20–80% by weight of units of the formula

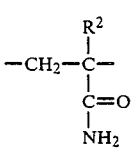

and up to 20% by weight of one or more units of the formulae

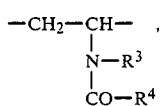

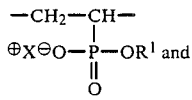

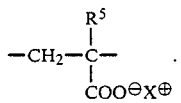

3. Metal chelates of water-soluble copolymers according to claim 1 wherein Y is a direct bond bridge member and wherein both $R^1$ and $R^2$ are methyl.

4. Metal chelates of water-soluble copolymers according to claim 1 wherein $X^\oplus$ is $H^\oplus$, an alkaline earth metal cation, an alkali metal cation, ammonium or a cation of lower aliphatic amines.

5. Process for the preparation of metal chelates according to claim 1 which comprises combining the water-soluble copolymer in water, a water miscible organic solvent or a mixture thereof with an aqueous solution of a salt or hydroxide of a polyvalent metal cation of the second to eighth main group or of the second sub-group of the Periodic Table of the Elements in a ratio range of 1:1 to 100:1 in terms of equivalents.

6. In a method of chelating polyvalent metal ions by contacting said ions with a chelating agent, the improvement comprises said chelating agent comprising water-soluble copolymers containing a statistical distribution of 1–86% by weight of structural units of the formula

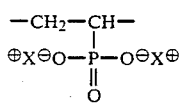

9-80% by weight of units of the formula

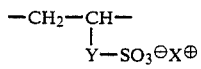

5-90% by weight of units of the formula

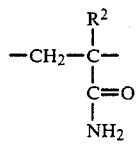

and up to 30% by weight of one or more units of the formulae

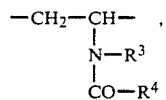

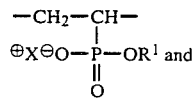

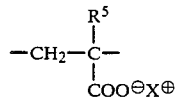

wherein
  $R^1$ is alkyl having 1 to 4 carbon atoms;
  $R^2$ and $R^5$ independently of one another are each hydrogen or methyl;
  $R^3$ and $R^4$ independently of one another are each hydrogen, methyl or ethyl or together are a trimethylene or pentamethylene;
  Y is a direct bond, phenylene or a moiety of the formula $-CO-NH-C(CH_3)_2-CH_2-$; and
  $X^\oplus$ is a cation or $H^\oplus$.

* * * * *